April 21, 1970   G. STAVIS   3,507,984
LASER MULTICOLOR TELEVISION DISPLAY APPARATUS
Filed Nov. 17, 1966   5 Sheets-Sheet 1

FIG. 1

INVENTOR.
GUS STAVIS
BY
ATTORNEY

April 21, 1970   G. STAVIS   3,507,984
LASER MULTICOLOR TELEVISION DISPLAY APPARATUS
Filed Nov. 17, 1966   5 Sheets-Sheet 2

INVENTOR.
GUS STAVIS
BY
ATTORNEY

INVENTOR.
GUS STAVIS
BY *H. L. Mackey*
ATTORNEY

April 21, 1970     G. STAVIS     3,507,984
LASER MULTICOLOR TELEVISION DISPLAY APPARATUS
Filed Nov. 17, 1966     5 Sheets-Sheet 5

INVENTOR.
GUS STAVIS
BY H. S. Mackey
ATTORNEY

United States Patent Office

3,507,984
Patented Apr. 21, 1970

3,507,984
LASER MULTICOLOR TELEVISION DISPLAY APPARATUS
Gus Stavis, Briarcliff Manor, N.Y., assignor to Singer-General Precision, Inc., a corporation of Delaware
Filed Nov. 17, 1966, Ser. No. 595,106
Int. Cl. H04n 9/14
U.S. Cl. 178—5.4                                    12 Claims

ABSTRACT OF THE DISCLOSURE

The disclosed embodiment of the invention is an optical scanning device for converting modulated laser beams into visual images. A rotatable drum is provided with a plurality of light transmissive multifiber bundles on its outer periphery. The ouput end of each bundle is torsionally displaced with respect to the input end by 180°, such that movement of the input end past a beam of light will produce one scan line at the output end. Each bundle is positioned with respect to the axis of the drum such that successive scan lines produced by adjacent bundles are displaced from one another. In one embodiment adjacent bundles have a different angular orientation with respect to the drum axis. In another embodiment adjacent bundles have a different radial position from the drum axis.

---

The present invention relates generally to multicolor television display systems. More specifically the invention relates to a novel optical scanning device for converting modulated laser beams into visual images corresponding to the modulating information.

Prior art television display systems are known in which color video signals are employed to modulate corresponding colored beams of light, the modulated beams then being converted by a scanning mechanism into television images. Typical of such state-of-the-art systems is the one illustrated in Patent Number 2,840,632. In this system, however, a relatively complex multidrum mechanical optical scanning device is required to generate the conventional rectangular television raster. Furthermore, a light modulating system incorporating a noncoherent light source is used. Consequently, the prior art apparatus inherently suffers from poor frequency response, low modulation efficiency, low optical efficiency and the like, rendering it almost incapable of producing a high quality, high resolution television image. In addition, it is critical in adjustment and therefore unreliable and expensive to fabricate.

Accordingly, it is the primary object of applicant's invention to provide a much simpler, more reliable and more efficient scanning method and apparatus than has heretofore been taught in the prior art.

To accomplish this, applicant's invention contemplates the application of a single rotating scanner drum having contiguously mounted on its rim a series of light transmissive multifiber rods or bundles individually twisted about their longitudinal axis so that the output ends of the fibers are reoriented with respect to their input ends. The result is an optically and mechanically simple, scanning device of unique design capable of converting a beam of visible modulated light simultaneously into both horizontal and vertical scanning components.

Another important object of the instant invention is to provide means for generating a plurality of differently colored laser beams and for modulating these beams with the corresponding color video information obtained from a color television receiver. While it may not be entirely new to modulate laser light beams with video information (see for example Patent No. 3,154,471), the use of laser light sources in applicant's invention marks a dramatic advance over the noncoherent light sources employed in prior art television display systems particularly in terms of color intensity, contrast ratio, spot resolution control, directionality, and overall optical efficiency.

Considering the more specific aspects of applicant's invention, suitable optics are provided to converge, mix and focus the modulated laser beams at a predetermined fixed point in space. The scanning drum is then positioned to permit serial registration of the input faces of the fiber multi-bundles and the fixed beam convergence point as the drum rotates on its axis. For reasons which will be made more evident below the twisting of each multifiber bundle about its longitudinal axis causes the output image or spot corresponding to the beam convergence point to appear to move through a distance twice the wdith of each bundle as the latter moves through its own width. In this manner, repeated scanning of the convergence point by the multifiber bundles on the drum produces a "sawtooth" or horizontal line scan in the output image plane of the drum.

Relatively slower frame or vertical scanning is accomplished in one of two ways. In one embodiment, the output face of each bundle is simply displaced to a smaller drum radius than its predecessor by a distance equal to one line. In this arrangement, the bundles are not parallel to the drum rotation axis ((except for the first one), but make a progressively increasing angle with it.

In another embodiment, the rim contour of the drum is machined to follow an Archimedean spiral, thus permitting the bundles to progressively decrease their radial distance at a constant rate but remain parallel with regard to the rotation axis of the drum.

In either case, specific design parameters, (i.e., drum rotation rates, fiber bundle size and quantity, relative bundle displacement and the like) are configured to generate a rectangular television image raster having a horizontal line scan rate of 525 lines per frame, and a frame scan rate of 30 frames per second with 2:1 interlacing and a 3:4 aspect ratio all in accordance with NTSC television standards. The video image developed in the drum output plane is then projected and/or enlarged through a conventional projection lens of any convenient focal length. Furthermore, a synchronous motor energized by a power amplifier is employed to rotate the scanning drum with the drive being slaved to the vertical sync signals derived from the television receiver.

Additional objects and advantages of the invention will be apparent from a study of the following detailed description of the preferred forms of the invention, read in connection with the accompanying drawings wherein:

Figure 1:
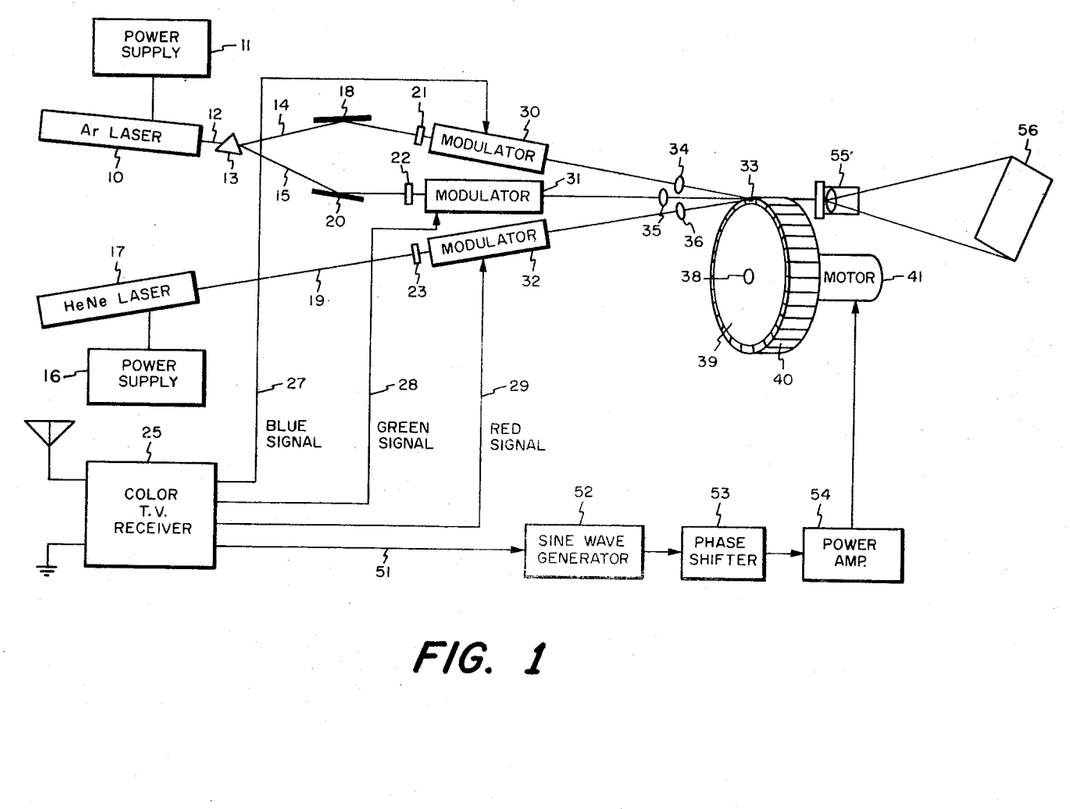
FIG. 1 is a schematic representation of the color television laser display system constructed in accordance with the concepts of the invention.

Turning now to FIG. 1, an argon laser light source 10 energized by its concomitant power supply 11 produces a high intensity coherent visible beam of light indicated generally at 12. The beam 12 includes both blue and green coherent outputs (CW) at wavelengths of 4545 A., and 5145 A., respectively. Since this type of laser light source is a well-known commercially available item (e.g., Model LG–12, manufactured and sold by Raytheon Company, Waltham, Mass.) a detailed description of same is believed unnecessary.

Interposed in the path of beam 12 is an optical dispersion device 13 for angularly dividing the former into two separate colored beams, one blue (4545 A.) indicated generally by reference character 14, the other green (5145 A.) indicated generally by reference character 15. Although other well-known optical dispersion devices such as, for example, diffraction gratings or dichroic filters may be used for this same purpose it is considered preferable to employ a conventional refractive prism because of its high transmittance efficiency.

A helium-neon laser light source 17 energized by power supply 16 generates a third high intensity (CW) coherent visible light beam 19, this one, however, having a spectral output at 6328 A. red. Helium-neon laser light sources are also well-known and commercially available as, for example, Model 5500 sold by Perkin-Elmer, Norwalk, Conn., and will, therefore, not be described in detail. Suffice it to say, at this point that the construction of the laser light sources form no part of the instant invention and that any combination of conventional laser light sources may be employed as long as separate red, green and blue coherent outputs are made available.

Reflective surfaces 18, 20 redirect beams 14, 15 which have been angularly displaced by prism 13 through conventional optical attenuators 21, 22, respectively. Beam 19 passes directly from laser source 17 through optical attenuator 23. The function of the optical attenuators which are individually adjustable is to balance the laser beam outputs with regard to their respective color output intensities.

A conventional commercially available high quality color television receiver 25 is provided such as the RCA Model GG–811M offered by the RCA Sales Corp., Indianapolis, Ind. The receiver 25 is modified slightly by removing its three-gun cathode ray picture tube and associated convergence circuitry. The blue, green and red primary color signals produced by the receiver's color demodulator and matrix circuitry and which would normally be fed to the corresponding cathodes in the three-gun picture tube are instead coupled to separate light modulators 30–32, respectively, via circuit path means 27–29, respectively. Light modulators 30–32 being conventional are preferably of the type known as the S2A modulator sold by Sylvania Electronic Systems, Waltham, Mass. This model requires only 700 volts (peak) for 100% modulation and can provide a contrast ratio of 100:1 and peak transmission of 80% or more over the required modulation bandwidth at any of the three spectral wavelengths of interest herein. However, it is anticipated that any equivalent conventional light modulator adapted to respond to applied electrical signals for intensity modulating a coherent light beam would be suitable for the purposes of the invention.

As generally shown in FIG. 1 each modulator 30–32 is disposed within the path of a particular laser beam and is adapted to intensity (amplitude) modulate that beam in response to the particular color video signal applied to it. For example, the video signals representing the blue color component of a transmitted color television picture are fed along path 27 to modulator 30 which in response to these signals intensity modulates the blue laser beam 14 initially generated by argon laser 10. The green laser beam 15 produced by argon laser 10 and the red laser beam 19 generated by helium-neon laser 17 are intensity modulated in similar fashion. By this arrangement the color television signal components are translated into three corresponding modulated laser beams.

Since physically speaking each light modulator is mounted in a housing only 1.5 inches in diameter and approximately 3.5 inches in length it is possible to compactly arrange the three modulators in radial fashion as generally indicated in FIG. 1. This arrangement is preferred to enable the respective modulator output beams to converge towards a common spot or point 33 which is fixed in space. To visualize this more clearly, image point 33 as the apex of a stationary hypothetical cone, and the three modulated beams as elements contained within the cone's surface.

Each lens element 34–36 is respectively situated between the output plane of a single modulator and the stationary point 33 in order to intercept and focus a particular modulated laser beam at point 33. This results in the reduction of each beam's diameter so that the size of the stationary multicolor image spot formed by the mixing beams as they come together at point 33 is capable of resolution by the optical waveguides 40 on rotating scanner drum 39. Disregarding the effect of the modulators, each laser output has a beam spread of only .02 degree yielding a rather well collimated beam 2 mm. in diameter. Therefore it is possible using ordinary optics to obtain a focused image spot on the order of 7 microns in diameter. If necessary, an apertured plate may be used to reduce the size of the image spot even further inasmuch as the latter is fixed in space.

As just mentioned, the modulated beams may be physically idealized as elements contained within the stationary hypothetical conical surface converging toward the latter's apex, namely, point 33. Thus the laser beams will not be coaxial or parallel at this point but instead will have a slight angular flare. This is not critical, however, because as will be pointed out later the focused image spot at point 33 is small enough to permit this angular spread to be accommodated by the acceptance angle of the waveguide elements.

As generally shown in FIG. 1 scanner drum 39 is supported on axis 38 for rotation by motor 41. Affixed to rim of the drum is a contiguous series of individual optical waveguides 40. These waveguides are fabricated from well-known light transmissive fiber bundles or rods or simply multifibers as they are more usually called.

As is well known in the optical fiber arts each multifiber comprises a generally elongated bundle or rod of parallel oriented light transmissive fibers wherein each fiber is surrounded by a jacket or cladding. In relatively short lengths such as those used in the instant invention, the bundles are extremely coherent from end to end, and defects tending to reduce their optical efficiency such as shear distortion, gross distortion, blemishes and the like are negligible.

In proceeding further with the detailed description of the invention, it is considered helpful to use actual numerical values for essential design parameters. However, this should not be construed as limiting the invention to these specific values as it is believed obvious that many variations in design may be made in carrying out the principles of the invention.

Figure 2:
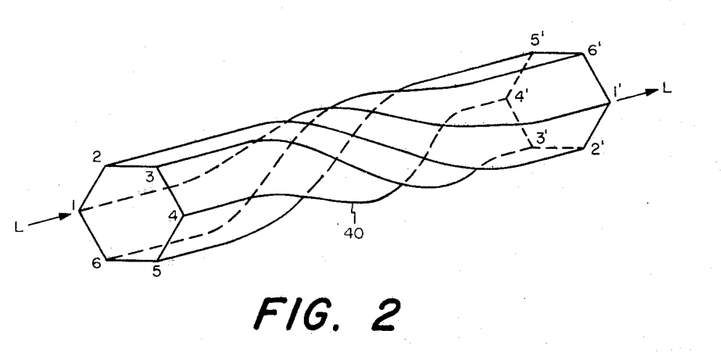
FIG. 2 is a perspective view of one form of the novel optical multifiber waveguide used in the invention.

FIG. 2 illustrates a single optical multifiber waveguide. In the preferred form of the invention each multifier 40 is hexagonal in cross-section, has a nominal diameter of 0.10 inch across the corners, is 1 inch long and has a density of 250 fibers from corner to corner. Furthermore, each fiber has a diameter on the order of 10 microns and it is therefore readily capable of resolving the slightly flared image spot focused at point 33 (FIG. 1). (The latter it will be recalled is merely 7 microns in diameter.)

As further illustrated in FIG. 2, each multifiber is axially twisted about its longitudinal axis so that the position of the output end of each fiber in the output face of the multifiber is shifted or displaced 180° relative to the position that same fiber's input end occupies in the input face of the multifiber. For example, a light beam L entering the fiber located at the left most corner of the input face of the multifiber (indicated at 1 in FIG. 2) will exit from that fiber at a position displaced in the exit plane of the multifiber, i.e., the rightmost corner (indicated at 1' in FIG. 2). In effect, the twisted multifiber has transferred the light beam L across the width of the multifiber. In similar fashion a 180° position transfer will occur with respect to light entering any fiber in the input face of multifiber 40, the reference numerals 2-6 in FIG. 2 indicating in an exemplary manner the displacement effect of the fibers located only in the extreme corners of the multifiber input face.

Figure 4:
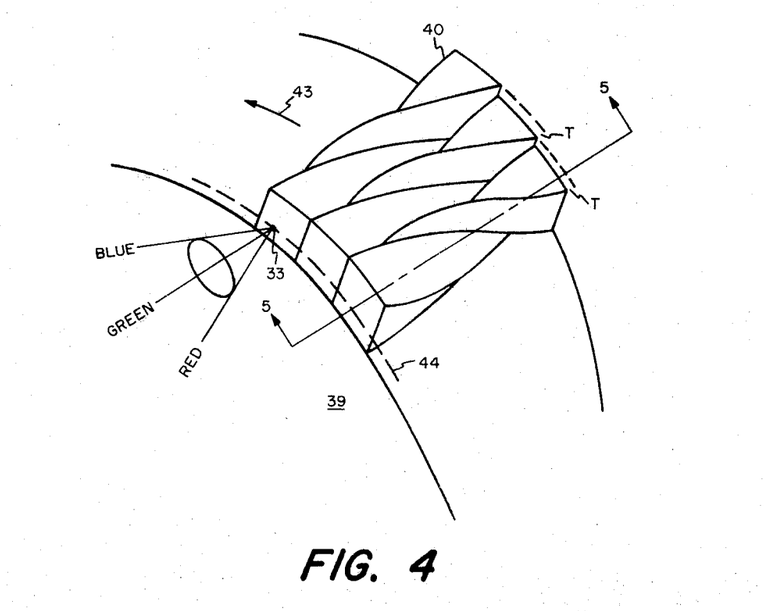
FIG. 4 is a perspective view illustrating one preferred embodiment of the scanning drum used in accordance with the invention.

Turning to FIG. 4, it can be seen that the twisted multifibers are mounted side-by-side on the rim of rotating drum 39 with their respective longitudinal axes extending more or less parallel to the drum's spin axis 38. Also, the drum is positioned in space so that as it rotates on its axis, the input face of each twisted multifiber bundle successively registers with the multicolored modulated image spot focused at stationary point 33. For a clear visualization of this state of affairs reference may be had in FIG. 4 to the arrow 43 which indicates the direction of drum rotation and the broken line 44 which designates the relative motion between the stationary image spot focused at point 33 and the input faces of ihe multifibers 40. Note that the input face of each multifiber bundle is located at the same radial distance with regard to the drum axis. For this reason, the same relative horizontal row of fibers in each multifiber input face sweeps across the fixed image spot. In passing, it is pointed out that in FIG. 4 a square bundle cross-section is shown only for simplicity. In actuality the cross-section may be hexagonal or circular and the drum is positioned so that the input image spot is nominally scanned by the central horizontal diameter of each multifiber, shown, for example, as diameter 1-4 in FIG. 2.

Figure 3:
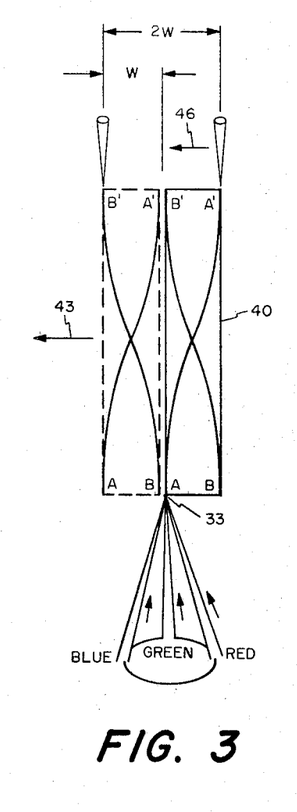
FIG. 3 is a diagrammatic view illustrating the scanning method pertaining to the invention.

Referring now to FIG. 3, it will be explained how the twist in each multifiber element results in horizontal translation of the image spot focused at point 33 and thereby generates the horizontal line scanning component of a television image raster. In FIG. 3, the broken lines represent the position of multifiber 40 after it has traversed the image spot at 33 by an amount equal to its width. Consider that when multifiber 40 initially registers with the image spot at 33, the light will enter fiber A in the left most column of fibers in the multifiber face. Due to the twist in the multifiber bundle, the light will exit at A' (the output end of fiber A). At this point it is displaced in space by an amount equal to the width W of the multifiber and in a direction opposite to the direction of drum rotation 43. As the drum continues to rotate, the image spot at 33 will sequentially enter horizontally related fibers until fiber B is reached. Coincidently, the image spot at the output face of the multifiber will travel from A' to B' in the direction of motion of the multifiber, indicated by arrow 46. Thus, adding together the motion of the output image spot across the bundle and the motion of the bundle across the input image spot, it is clear that the output image spot will move through a distance twice the width, W, of the multifiber as the multifiber moves through its own width.

The next multifiber then begins its scan of the fixed image spot at point 33 and as the image spot registers with the left most fiber in its input face, the output image spot "flies back" to the original point A' displaced in space opposite to the direction of drum rotation. If the process is repeated at a high enough frequency, the oscillating image spot in the output plane of the drum will appear as a horizontal line due to the familiar persistance of vision factor of the human eye.

Now it is well known that in order to comply with television standards, 525 horizontal lines must be scanned per frame. Accordingly, 525 multifibers are to be mounted on a drum having a nominal diameter of 16.7 inches. Provision is made to rotate the drum at a speed of 30 r.p.s. thus deriving a horizontal "sawtooth" scanning rate of 15,750 lines per second. Furthermore, it is desirous that the resolution of the developed image be at least on the order of 360 lines and, therefore, the effective number of fibers across diameter 1-4 of multifiber 40 (FIG. 2) cannot be less than this. The choice of 250 fibers, 10 microns each on a 0.10 inch wide multifiber element, however, meets this requirement because the doubling of the scan dimensions from input to output face of the multifiber effectively doubles the number of resolution elements to 500 for the given multifiber diameter. This is so because each fiber occupies two resolvable positions in the output plane of each multifiber. Also, since the diameter of the focused image spot at point 33 is on the order of 7 microns and each fiber diameter is 10 microns, it will be apparent that the latter controls resolution.

Doubling the scan dimension from input face to output face of each multifiber has several other beneficial effects worth noting. For example, it produces an enlargement of the image to be projected, or conversely allows use of a smaller multifiber and rotating drum for a given image size. Furthermore, because the image in the output plane of the scanner drum is formed by successive moving multifibers carrying modulated light, the dark boundaries between fibers due to the cladding around each is not observed. Rather, the motion of the bundles renders this sharp line between fibers invisible. This is a significant factor in producing a quality picture. Some scanning techniques which make use of optical fibers to convert circular to linear motion cause a light spot to move across the optical fibers. In such a case the discreteness of the fiber structure is visible in the image. The technique proposed here does not suffer from this effect. Furthermore, the individual multifiber elements have some randomness in position (although usually within a half fiber thickness) tending to merge the horizontal lines of the raster. In high resolution television systems an analogous random jitter in the vertical direction has often been introduced deliberately to improve visibility where the picture information contains thin horizontal lines. Otherwise these lines tend to flicker in or out if the picture line falls between raster lines.

It will be recalled that each multifiber input face is located at the same radius of rotation and that therefore the focused image spot nominally scans the same horizontal row of fibers relative to each input face such as, for example, diameter 1-4 depicted in FIG. 2. In order to generate a complete image raster, however, provision must be made to vertically translate each successive horizontal line generated in the drum's output plane. To meet this requirement two techniques are proposed.

Figure 5:
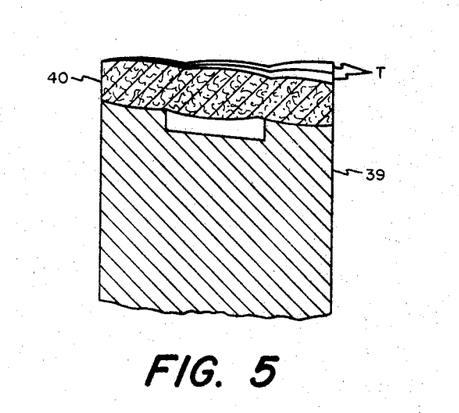
FIG. 5 is a sectional view of the scanner drum taken on the line 5–5 of FIG. 4 showing the manner in which the optical multifiber bundles are mounted on the drum.

In the embodiment illustrated in FIGS. 4 and 5 vertical scan is provided by simply mounting each multifiber on the drum rim so that each successive exit face is displaced in the radial direction relative to the preceding exit face by an amount represented by the letter T. It must be emphasized, however, that only the output or exit faces of the bundles are displaced, the input faces remain at equal radial distances relative to the drum's rotation axis.

This results in a drum configuration wherein each successive multifiber bundle makes a progressively increasing angle with the drum's spin axis (the angle being measured in a plane including the longitudinal axis of each bundle and the drum's rotation axis).

Since provision is to be made for 2:1 interlaced scanning the exit-face to exit-face radial displacement between successive multifibers will be two lines and the pattern of decreasing radial distance will be repeated once during a single drum rotation. The technique of interlaced scanning is well known in the television arts, hence it is not necessary to explain it in detail herein.

From the foregoing, it is believed obvious that as each successive multifiber samples the modulated image spot at point 33 and paints a corresponding horizontal line in the output plane, each successive line will be displaced in space lower than the previous one by an amount equal to T. A complete rectangular image raster defined by both horizontal and vertical velocity vectors will thus be generated in the output plane of the drum. Moreover, since the image spot at point 33 comprises a source of modulated video chrominance information, the raster image developed in the output plane of the drum will be a real color television picture.

In the embodiment illustrated in FIGS. 4 and 5, it is proposed to generate the raster with a standard aspect ratio of 3:4 and, as has already been mentioned, with 2:1 interlacing. Therefore, the cumulative change in the radial distance of all multifiber exit faces over one half of the drum's periphery must be an amount equal to ¾ of the horizontal output scan distance or in the instant case ¾ ×0.2=0.15 inch. Since there are two interlaced fields per frame, it is apparent that the radial change corresponding to full vertical translation of the raster must necessarily occur in one half of a drum rotation in order to generate each interlaced field. Thus, there are 262½ multifiber bundles disposed over the first half of the drum circumference for scanning the odd numbered lines of the first interlaced field and 262½ multifibers beginning with the second half of the 263rd multifiber on the remaining half of the drum circumference for generating the even number lines of the second interlaced field. It will be understood further that the second half of the 263rd multifiber bundle beginning the scan of the second interlaced field is mounted on the drum periphery at the same radial distance as the first multifiber bundle and is therefore mounted on the periphery at a radial distance 0.15 inch greater than the radial distance of its other half, which latter, of course, constitutes the final scanning element for the first interlaced field.

It is to be noted that the exact location of the focused image spot at point 33 (FIGS. 1, 3 and 4) with respect to the multifibre input faces is not critical because once the radial position of the output face of each bundle is accurately determined the input spot can be moved up or down, by several horizontal rows of fibers without affecting picture interlace. Nonetheless, great accuracy must be maintained in the relative radial positioning of the multifiber output faces on the drum's rim. While machining the rim's surface to within a tolerance of 3½ microns (i.e., the tolerance found to be necessary for proper raster formation and interlacing) is possible, it is difficult and therefore expensive.

Figure 6:
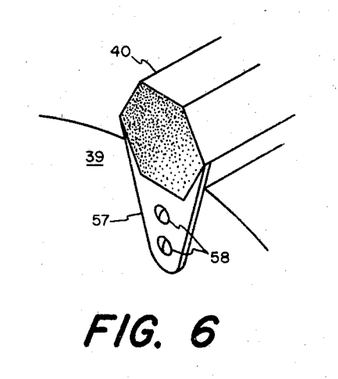
FIG. 6 is a perspective view showing means for mounting the multifiber bundles on the rim.

As an alternative the multifibers may each be mounted on brackets or fixtures which in turn are mounted on the drum near the latter's rim surface. This arrangement is illustrated in FIG. 6. Each multifiber element 40 is mounted with epoxy on brackets 57 to within reasonably good dimensions. Final adjustment to within required tolerances is then made on the drum through the adjustment of conventional fixture mounting elements 58. This method of fabrication will permit the use of a cylindrical drum capable of being fabricated in a straightforward manner. Once aligned the entire peripheral surface of the drum may be epoxyed to permanently preserve the alignment.

As pointed out above in connection with the embodiment illustrated in FIGS. 4–6, vertical raster scan may be achieved by radially displacing only the output faces of the multifiber waveguides. Thus, the multifiber bundles are not parallel to the drum's spin axis (except for bundle 1 and the second half of bundle 263), but make, respectively, progressively increasing angles with it. As a result, assembly of the drum is relatively complex and requires great care.

Figure 7:
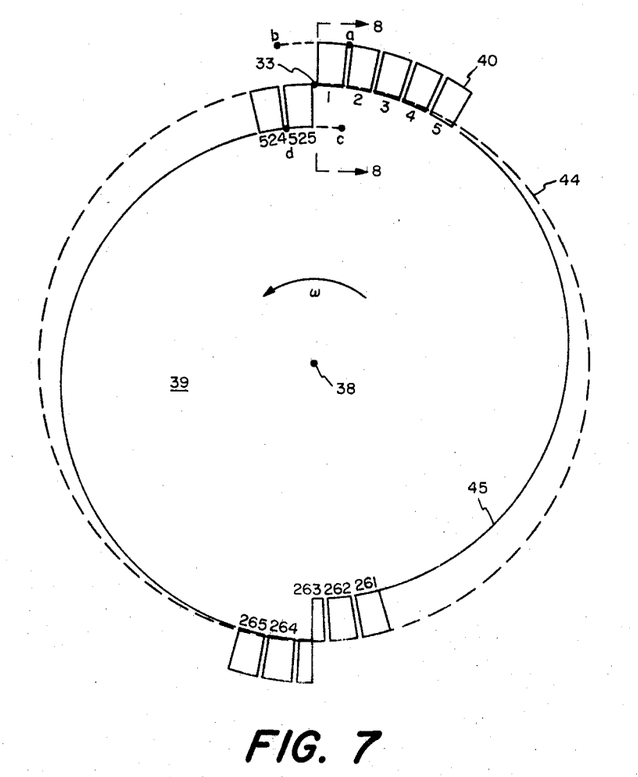
FIG. 7 is a front view of another preferred embodiment of the scanning drum employed in accordance with the invention.
Figure 8:
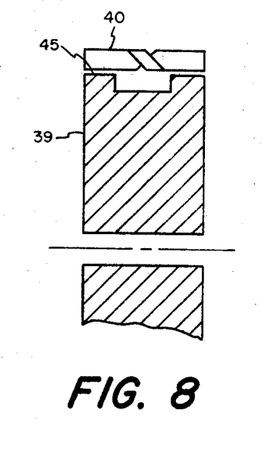
FIG. 8 is a sectional view taken on the line 8—8 of FIG. 7.
Figure 9:
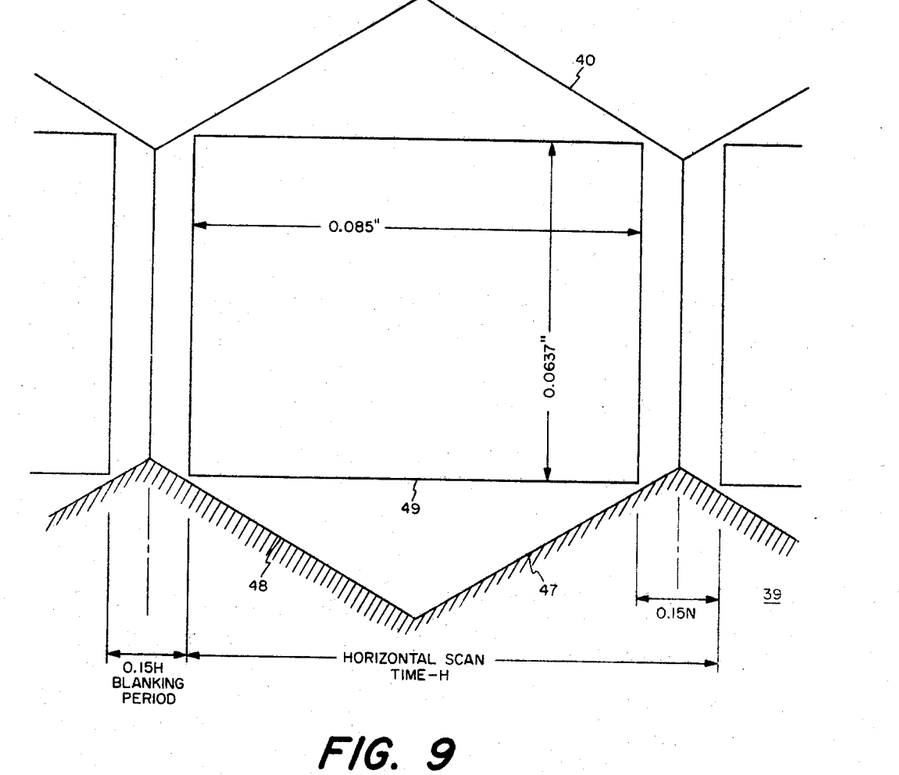
FIG. 9 is a detail showing one method of mounting the fiber bundles on the scanning drum illustrated in FIG. 9.

In the alternate embodiment illustrated in FIGS. 7–9, however, vertical raster scan is obtained despite the fact that all the multifiber bundles are mounted on the scanner drum with their respective longitudinal axes truly parallel to the latter's spin axis. Consequently there is no relative displacement between successive multifiber output faces. How this is achieved will now be explained in connection with FIG. 7.

Each half of the drum's periphery is machined to follow the contour of an Archimedean spiral having a predetermined rate of change of curvature. As is well known, an Archimedean spiral is a plane curve generated by a point moving toward a fixed point at a constant rate while the radius vector from the fixed point rotates at a constant rate. Thus, the radial distance of the drum's peripheral or rim surface 45 decreases at a constant rate with respect to its spin axis. As illustrated in FIG. 7, there are two identical spirals each covering one half of the drum's circumference. This results in the same amount of radial decrease occurring twice per drum revolution. Moreover, as shown in FIG. 8, the rim surface itself always remains parallel to the drum's spin axis, and therefore it is possible to contiguously dispose each successive multifiber bundle 40 on this surface at a constantly differing radial distance relative to rotation axis 38, yet at the same time maintain the longitudinal axis of each twisted multifiber bundle parallel to the rotation axis.

Now in FIG. 7 it can be seen further that the focused image spot at point 33 will initially be scanned by the lowermost row of fiber bundle 1. Remembering that each bundle is twisted 180° about its longitudinal axis, this row of fibers, then, occupies the uppermost edge in the output face of bundle 1. Therefore, as bundle 1 moves through its own width the first line of the raster is generated starting at point $a$ and terminating at point $b$ in the output plane of the drum. Bundle 2 then intercepts the image spot focused at fixed point 33. However, because bundle 2 is now located at a shorter radial distance relative to the spin axis, a horizontal row of fibers above the bottommost row traverses the image spot at 33. This can be observed in FIG. 7, wherein broken line 44 represents the focused image spot scanning-path across the bundles' respective input faces during drum rotation. In the output face of bundle 2, the output of the second row is immediately below the topmost row (due to the twist) and, accordingly, the second horizontal scan line is generated parallel to but below line $a$–$b$. Each successively generated horizontal line is likewise generated in the raster at a position lower than the previous line. The lowermost line in the generated raster is exemplified by bundle 525 which scans the image spot at point 33 across its topmost row when drum rotation approaches top dead center. At this moment the output image being generated in the bottommost row of the bundle output face first appears at $c$ (again because of bundle twist) and progresses to $d$ at which time bundle 1 again starts to generate the next frame of the television picture. To repeat, the embodiment in FIGS. 4–6 requires that the input image spot at point 33 scan only the nominally central horizontal row of fibers in each bundle input plane. On the other hand, as respects the alternate embodiment just described, the input image spot scans a different radially related horizontal row of fibers in each successive bundle input face. Thus, in contrast to the embodiment of FIGS. 4–6 wherein the 180° twist in each bundle was instrumental only in generating the horizontal line in the output plane, the embodiment of FIGS. 7–9 essentially requires that the twist be in each bundle in order to produce both horizontal and vertical translation of the output image spot in the drum's output plane. Therefore in order to preserve a 3:4 aspect ratio in the output image raster of the latter embodiment, the twofold enlargement of the output image scan dimension in the vertical direction as well as the horizontal direction must be considered.

Moreover, in order to position the bundles accurately it is proposed that the circumferential edge of the drum be machined in a manner similar to that of a precision gear. The resulting toothed edge will provide "V-block"

type slots to receive each of the bundles and thus provide accurate locations for each. By using techniques developed for precision gear production in combination with the techniques for generating non-circular gears (in this case a spiral contour) a very accurate scanning drum may be made.

In FIG. 9, a detail of this construction is shown wherein a hexagonally cross-sectional multifiber 40 is supported in a slot on the edge of drum 39 defined by diverging side walls 47, 48. Each bundle contiguously abuts its neighbors as shown, the spacing between each bundle center being 0.1 inch. According to standard television practice, about 15% of horizontal scanning time is for retrace purposes and contains no picture information. Therefore the useful horizontal width of each bundle will be .85 x 0.1 or .085 inch. Also, to preserve a 3:4 aspect ratio and 2:1 interlacing the total vertical displacement of the bundles over each half of the drum rim circumference must be ¾ x .085 or .0637 inch. This dimension determines the total change in radius of the spiral contour over half the drum rim circumference (e.g., the radial change between the 1st bundle and the first half of the 263 bundle). Considering the magnification factor of 2 introduced by the twisted multifibers in both the vertical and horizontal scan directions, the image raster in the output plane of the drum will have dimensions of 0.170 x 0.127 inch. This is essentially the same as an 8 mm. motion picture frame. It will be observed that 2:1 interlacing is achieved in this embodiment as in the same manner it is achieved in the embodiment of FIGS. 4–6.

Furthermore, while more care must be taken in the alternate embodiment in positioning the focused image spot relative to the input face of the multifibers, it is still not critical. It is important only that an effective scanning area corresponding to rectangle 49 in FIG. 8 be utilized on each bundle input face. In addition, the half bundles comprising bundle 263 together with some of their immediate neighbors need not actually exist physically since their passage coincides with a vertical retracing period.

Returning now to FIG. 1, it will be remembered that scanner drum 39 is rotated on its axis 38 by a motor 41. In order to generate an interlaced raster having a horizontal line scan frequency of 15,750 cycles per second and a vertical line sweep rate of 60 cycles per second, scanner drum 39 as previously indicated must be rotated at a rate of 1800 r.p.m. (30 r.p.s.). Moreover, drum rotation must be very accurately phase related to the transmitted video information. Therefore circuit means are provided to lock motor 41 to the vertical synchronizing signals made available by television receiver 25. As is well known conventional television receivers employ circuits to separate the 60 c.p.s. vertical synchronizing pulses from the composite video signal. The receiver also includes means responsive to the separated sync pulses for generating a synchronized sawtooth wave output which latter is used to energize the vertical deflection circuits of the picture tube. Various sawtooth generating circuits of this type are described in detail on pages 216–222 of the book "Television Principles" by Dome, published by McGraw-Hill in 1951. Accordingly, receiver 25 is tapped to provide vertically synchronized sawtooth voltages along line 51 whereby the latter are coupled to sine wave generator 52. The latter is a conventional well known low-pass filter circuit and in response to the sawtooth wave input generates a 60 c.p.s. sinusoidal voltage waveform at its output. This sine wave output is then fed through a conventional phase shifting circuit 53 comprising a variable resistor and capacitor configuration for achieving exact synchronism between sine wave phase and the vertical sync pulse train originating at receiver 25. The output of the sine wave generator is then power amplified through conventional power amplifier 54 and fed to motor 41. This motor may be any conventional hysteresis-synchronous type rated at 60 c.p.s. and 1800 r.p.m. such as the Model LCL sold by Globe Industries, Dayton, Ohio. By this arrangement the rotation of scanner drum 39 is accurately phase locked to the vertical sync signals contained in the transmitted video information.

As already mentioned the size of the video image produced in the plane defined by the multifiber output faces is on the order of that of an 8 mm. motion picture frame. Therefore a conventional 8 mm. projection lens 55 may be used to project the image to any distance and size depending upon choice of focal length. This is indicated generally by reference character 56 in FIG. 1.

From the foregoing it is apparent that the invention provides an extremely simple scanning device employing conventional optical multifiber waveguides in an unique manner for converting a source of modulated visible light into a corresponding television image composed of horizontal and vertical scanning components and without the prior art requirements of extraneous and complicated instrumentalities and systems. Once registration at the input face of the multifiber elements is achieved it is inherently preserved throughout the scanning and projection system. Dimensional stability is needed only in positioning the laser light sources and modulators relative to each other, the exact location of the focused image spot with respect to the input faces of the multifibers on the scanning drum not being critical. Furthermore, by using coherent modulated light sources the optical efficiency of the entire system has been found to be on the order of 50% rendering it possible to produce very high quality, high definition video images. Thus, it is obvious that simple, economical and efficient means has been provided for accomplishing all the objects and advantages of the invention.

Nevertheless, while particular preferred embodiments of the invention have been shown and described, many modifications within the spirit and the scope of the invention may be made. For example, the improved scanning device of the present invention is readily applicable to monochrome television display systems as well as color. Also, the raster may be generated by using a rate of scan differing from the NSTC standard. Similarly, the image conversion technique proposed herein could readily be adapted for use in communication systems other than television such as, for example, radar, telegraphy, facsimile and the like. Obviously, many changes in the details of construction, and arrangement of parts may also be made without departing from the spirit of the invention as expressed in the accompanying claims and the invention is not to be limited to the exact specifications shown and described as only the preferred matters have been given by way of illustration.

What is claimed is:
1. Television display apparatus, comprising:
    laser light source means for generating a visible beam of coherent light,
    television receiver means for providing a source of video signals and a source of synchronizing signals,
    means coupled to the beam and responsive to the video signals for modulating the beam in accordance therewith,
    a drum,
    a plurality of enlongated light transmissive multifiber bundles contiguously mounted on the rim of said drum, the movement of each bundle past the path of the modulated beam of light producing a respective scan line, each of said bundles being positioned with respect to an axis of the drum such that successive scan lines produced by adjacent bundles are displaced from one another, and
    drive means responsive to the synchronizing signals for rotating the drum.
2. Television display apparatus, comprising:
    laser light source means for generating a visible beam of coherent light,
    television receiver means for providing a source of video signals and a source of synchronizing signals, means coupled to the beam and responsive to the video signals for modulating the beam in accordance therewith, rotatable drum scanner means having a plurality of elongated light transmissive multifiber bundles contiguously mounted on its rim for converting the modulated beam into a real image corresponding to the video signals, each multifiber bundle includes an input end and an output end, each multifiber bundle being torsionally displaced relative to its own longitudinal axis for reorienting the output ends of all the fibers in the bundle with reference to their respective input ends by a magnitude of 180°, and drive means responsive to the synchronizing signals for rotating the drum.

3. Television display apparatus in accordance with claim 2 in which:

optical means are provided for focusing the beam at a fixed point in space, the output end of each successive bundle being displaced relative to the output end of the immediately preceding bundle in the radial direction with respect to the drum's axis of rotation, and the scanner drum being positioned to enable each input end of each bundle to serially register with said fixed focus point as the drum rotates.

4. Television display apparatus in accordance with claim 3 in which:

the laser light source means comprises a helium-neon laser for producing a coherent beam of visible red light and an argon laser for producing simultaneously separate coherent beams of visible green and blue light, respectively, optical means is positioned to converge, mix and focus said beams at the point fixed in space, and the television receiver means is adapted to provide separate video primary color signals corresponding to red, green, and blue, respectively.

5. Television display apparatus of claim 3 in which:

the output end of each successive multifiber bundle is disposed at a progressively increasing angle with respect to the drum's rotation axis, said angle being measured in a plane including the axis of rotation and the longitudinal axis of each bundle.

6. Television display apparatus in accordance with claim 1 in which:

optical means is provided for focusing the beam at a fixed point in space, each multifiber bundle includes an input face and an output face, said scanner drum means being positioned to enable the input face of each bundle to serially register with the fixed focus point as the drum rotates, each multifiber bundle being axially twisted about its longitudinal axis so that the location of the output end of each fiber in the bundle output face is displaced 180° relative to that same fiber's location in the bundle input face, and the rim of the scanning drum being contoured to follow an Archimedean spiral whereby each succeeding multifiber bundle is displaced at a constantly differing radial distance from the drum's rotation axis and each multifiber bundle remains substantially parallel to said rotation axis.

7. The television display apparatus of claim 1 including projection means for displaying the video image developed in the plane defined by the output faces of the multifiber bundles at a location remote from said plane and for changing the overall size of the image developed in said image plane.

8. The television display apparatus of claim 1 wherein the drive means includes a sine wave generator, phase adjustment means, power amplifier means, and a hysteresis synchronous motor directly coupled to said scanner drum.

9. An optical scanning device, comprising:

drum means having a rim and mounted for rotation, a plurality of elongated light transmissive multifiber rods contiguously fixed to the rim in the general direction of the drum's rotation axis, each of said rods having an input end and an output end and each of said rods being axially twisted about its longitudinal axis whereby the location of the output end of each fiber in each of said rod's output face is displaced 180° relative to that same fiber's location in said rod's input face, and means for rotating the drum.

10. The optical scanning device of claim 9 wherein:

the output end of each rod is displaced relative to the output end of the immediately adjacent rod in the radial direction with respect to the drum's axis of rotation.

11. The optical scanning device of claim 9 wherein:

the output end of each successive rod is disposed on the drum's rim at a progressively increasing angle relative to the drum's rotation axis, said angle being measured in a plane including said rotation axis and the longitudinal axis of said rod.

12. The optical scanning device of claim 9 wherein:

the contour of the drum's rim follows that of an Archimedean spiral whereby the output end of each successive rod is located at a constantly differing radial distance from said drum's rotation axis and the rods remain substantially parallel to said axis.

References Cited

UNITED STATES PATENTS 2,840,632    6/1958    Parker ________________ 178—6

OTHER REFERENCES

Texas Instruments Bulletin No. DLA–1324, January 1966.

ROBERT L. GRIFFIN, Primary Examiner

R. L. RICHARDSON, Assistant Examiner

U.S. Cl. X.R.

178—7.6